United States Patent
Fitzgerald et al.

(10) Patent No.: US 8,116,638 B2
(45) Date of Patent: Feb. 14, 2012

(54) RADIO FREQUENCY (RF) SIGNAL RECEIVER USING OPTICAL PROCESSING AND ASSOCIATED METHODS

(75) Inventors: Bruce Fitzgerald, Vail, AZ (US); Richard DeSalvo, Satellite Beach, FL (US); Young Kai Chen, Berkeley Heights, NJ (US); Andreas Leven, Gillette, NJ (US); Peter J. Delfyett, Geneva, FL (US)

(73) Assignees: Harris Corporation, Melbourne, FL (US); University of Central Florida Research Foundation, Inc., Orlando, FL (US); Lucent Technologies Inc., Murray Hill, NJ (US)

( * ) Notice: Subject to any disclaimer, the term of this patent is extended or adjusted under 35 U.S.C. 154(b) by 977 days.

(21) Appl. No.: 11/755,478

(22) Filed: May 30, 2007

(65) Prior Publication Data
US 2007/0280704 A1 Dec. 6, 2007

Related U.S. Application Data

(60) Provisional application No. 60/803,460, filed on May 30, 2006.

(51) Int. Cl.
- *H04B 10/00* (2006.01)
- *H04B 10/04* (2006.01)
- *H04B 10/08* (2006.01)
- *G02B 5/18* (2006.01)

(52) U.S. Cl. ........ 398/198; 398/182; 398/185; 398/195; 398/183; 375/343

(58) Field of Classification Search .................. 398/198, 398/195, 182, 192, 115
See application file for complete search history.

(56) References Cited

U.S. PATENT DOCUMENTS

| | | | |
|---|---|---|---|
| 4,468,093 A * | 8/1984 | Brown | 359/310 |
| 4,850,045 A | 7/1989 | Funke | 455/607 |
| 4,921,347 A | 5/1990 | Wong et al. | 356/73.1 |
| 4,947,459 A | 8/1990 | Nelson et al. | 455/612 |
| 4,994,675 A | 2/1991 | Levin et al. | 250/551 |
| 5,041,997 A | 8/1991 | Hernday et al. | 364/571 |
| 5,175,492 A | 12/1992 | Wong et al. | 324/158 |
| 5,224,128 A | 6/1993 | Grallert | 375/104 |
| 5,239,481 A | 8/1993 | Brooks et al. | 364/486 |
| 5,264,905 A | 11/1993 | Cavanagh et al. | 356/6 |
| 5,311,196 A * | 5/1994 | Hanson et al. | 342/368 |

(Continued)

OTHER PUBLICATIONS

Jhon ["Clock Recovery from 40 Gbps Optical Signal with Phase Locked Loop Based Terahertz Optical Asymmetric Demultiplexer" Optical Communications 220 (2003 315-319)].*

*Primary Examiner* — Kenneth N Vanderpuye
*Assistant Examiner* — Oommen Jacob
(74) *Attorney, Agent, or Firm* — Allen, Dyer, Doppelt, Milbrath & Gilchrist, P.A.

(57) ABSTRACT

A signal receiver, such as an RF-matched filter receiver, includes an optical source (e.g. a mode-locked laser) providing an optical signal, and a first optical modulator to modulate the optical signal with a received RF signal and provide a modulated optical signal. A second optical modulator modulates the modulated optical signal with a reference signal and provides a twice modulated optical signal. The modulators may be Mach-Zehnder Modulators (MZM) and/or Indium Phosphide (InP) modulators. An optical detector receives the twice modulated optical signal and provides a detected signal, and a processing unit receives the detected signal and extracts or measures cross-correlation between the received RF signal and the reference signal.

12 Claims, 9 Drawing Sheets

U.S. PATENT DOCUMENTS

| | | | |
|---|---|---|---|
| 5,724,162 A * | 3/1998 | Garcia et al. | 359/22 |
| 6,175,672 B1 * | 1/2001 | Newberg et al. | 385/24 |
| 6,297,775 B1 | 10/2001 | Haws et al. | 343/700 |
| 6,708,003 B1 * | 3/2004 | Wickham et al. | 398/102 |
| 6,906,679 B2 | 6/2005 | Kneisel et al. | 343/816 |
| 6,950,062 B1 | 9/2005 | Mather et al. | 342/372 |
| 2002/0126644 A1 * | 9/2002 | Turpin et al. | 370/342 |
| 2004/0208642 A1 | 10/2004 | Chen et al. | 398/186 |
| 2004/0213579 A1 * | 10/2004 | Chew et al. | 398/183 |
| 2005/0002675 A1 * | 1/2005 | Sardesai et al. | 398/183 |
| 2005/0052725 A1 * | 3/2005 | Niklaus et al. | 359/321 |
| 2005/0068887 A1 | 3/2005 | Chen et al. | 370/215 |
| 2005/0078773 A1 * | 4/2005 | Astrachan | 375/343 |
| 2005/0168364 A1 | 8/2005 | Chen et al. | 341/137 |

* cited by examiner

RADIO FREQUENCY (RF) SIGNAL RECEIVER USING OPTICAL PROCESSING AND ASSOCIATED METHODS

CROSS-REFERENCE TO RELATED APPLICATION

The present application claims priority to U.S. Provisional Application Ser. No. 60/803,460 filed May 30, 2006 the entire disclosure of which is incorporated by reference herein.

FIELD OF THE INVENTION

The present invention relates to the field of communications, and, more particularly, to wireless communications and related methods.

BACKGROUND OF THE INVENTION

This section discusses aspects that may be helpful to facilitating a better understanding of the inventions. Accordingly, the statements of this section are to be read in this light. The statements of this section are not to be understood as admissions about what is in the prior art or what is not in the prior art.

The demand for wideband high data rate communications with spectral efficiencies greater than 1 bit/Second/Hertz has outstripped the capabilities of analog receivers and DSP processors.

For example, GSM cellular telephony devices represent the maximum signal density and speed available in off the shelf conversion and DSP chips. Analog to digital converters and Digital to analog converters for mixed mode signal processing are limited to sample rates of about 2 GSPS. Few DSP FPGA's operate at these rates with manageable power dissipation.

A method and apparatus for testing fiber optic hubs is directed to a fiber optic hub for local area networks and other data communication systems including an internal self-diagnostic and cable test capability for permitting off-line testing of the hub and of fiber optic cables connected to the hub. The hub includes a plurality of optical interfaces each having an optical receiver section and an optical transmitter section and hub-processing circuitry connected to the optical interfaces for processing data signals received by the optical receiver sections and for providing the processed data signals to the transmitter sections to be transmitted back through the network. Hub further includes a test signal source for generating a test signal to be transmitted from the transmitter sections of one or all of the optical interfaces, and a test signal detector connected to the receiver sections of the interfaces for detecting a test signal received by any of the receiver sections and for generating an error indicator signal when the received test signal differs from the transmitted test signal. The transmitter and receiver sections of any hub optical interface can be conveniently tested by looping a fiber optic cable from a transmitter section of any optical interface to the receiver section of any other optical interface and monitoring an error indicator (LED) illuminated by the error indicator signal. The hub also provides a convenient means for testing fiber optic cable connected to the hub.

A method and apparatus for calibrating a lightwave component measurement system is directed to a method and apparatus for calibrating absolute and relative measurements of modulation and/or demodulation transfer characteristics of electro-optical and opto-electrical devices during setup of a lightwave component measurement system for characterizing performance of fiber optic systems and associated components. The lightwave component measurement system calibrated in accordance with the method provides the capability to measure the optical, electrical, and, especially, the electro-optical (E/O) and opto-electrical (O/E) components with specified measurement performance. In accordance with the calibration method, when the lightwave component measurement system is used to characterize an E/O or O/E device, an initial calibration reference is established based on the known characteristics of a lightwave source and lightwave receiver included in the lightwave component measurement system. A measurement is then performed on the calibration reference (the lightwave source or the lightwave receiver), and error correction data are produced and stored in a lightwave component analyzer included in the lightwave component measurement system. The modulation (or demodulation) transfer characteristics are preferably given in terms of the responsivity magnitude and phase versus modulation frequency. A device under test (DUT) then is measured when it replaces its calibrated counterpart in the measurement setup. The lightwave component analyzer uses the error correction data when the E/O or O/E characteristics of the DUT are measured.

A Fiber Optic Link Noise Measurement and Optimization System is directed to an apparatus for optimizing system performance for use in a transmission and signal distribution system which includes at least one fiber optic link having transmission and receiving means. The apparatus includes apparatus for measuring noise signals in each fiber optic link and apparatus for generating system performance data corresponding to the noise signals measured by the noise measurement apparatus.

A method and apparatus for checking continuity of optic transmission is directed to an apparatus for checking continuity of fiber optic links from source to receiver before enabling the source delivers full power so as to thereby prevent eye damage to personnel and provide a supervisory signal to the system user that the link elements are intact and functioning. The apparatus includes a transmitter, a receiver and a detector for detecting that an optical transmission between the transmitter and receiver can be effected.

A Lightwave Component Analyzer relates to a lightwave component analyzer comprising at least an internal optical receiver and preferably also comprising an internal optical source which are selectively connectable by switches configurable by means of an internal or an external instrument controller for calibration and performance of electro-optical, opto-electrical, and optical measurements. The switches are arranged in a switch matrix. The configurable switch matrix is connected by the instrument controller in response to selection of a measurement by a user to facilitate calibration of, and test measurements of devices under test with, the lightwave component analyzer.

A calibration and error correction for electrical-source-to-E/O-device impedance mismatch and O/E-device-to-electrical-receiver impedance mismatch in a lightwave component analyzer is directed to a lightwave component analyzer including at least an internal optical receiver and preferably also including an internal optical source which are selectively connectable by switches configurable by means of an instrument controller for calibration and performance of electro-optical, opto-electrical, and optical measurements. Transmission measurements of E/O devices are corrected for source match errors, and transmission measurements of O/E devices are corrected for load match errors, in addition to frequency response and cross-talk error correction, Response and match error correction provides for improved measurements of test devices with an electrical port having an impedance different from that of the measurement system impedance.

A method and circuit arrangement for monitoring the operating condition of an electro-optical transmission system" is directed to recognizing the status of a "no light" condition at the signal input of a receiving terminal, measured values that correspond to the electrical signal level of received signals are stored at given time intervals. In the absence of digital signals, the contents of the memory, potentially in combination with a further measured value, are searched for a change in the amplitude of the received signal. Given a large level change, a "no light" condition is reported.

A method for measuring pulse distortion is directed to a method for measuring pulse distortion in a digital logic design. A digital logic block of interest is divided into its component primary logic functions. The pulse width distortion characteristics are determined for each primary logic function. The pulse width distortion characteristics are used to develop values representing the minimum pulse width required to guarantee full pulse amplitude propagation through each primary logic function. Thus, pulse distortion is characterized in terms of both width and amplitude components. Pulse width distortion for the entire logic block is then determined by following each logic path through the logic block and statistically summing the pulse width distortion characteristics for each occurrence of each primary logic function in the logic path. Pulse amplitude integrity is checked at the input to each primary logic function by referencing the pre-calculated values for minimum pulse width required to guarantee full pulse amplitude propagation through the primary logic function.

An Electro-optic Automated Test Equipment is directed to Primary and secondary mirrors that constitute a collimator which permit measurements to be made within a reasonably sized equipment enclosure. An incoming laser beam, from a unit undergoing test, has its light dispersed by an integrating sphere from which radiometric measurements may be made. Further, the output from the sphere passes through an avalanche photo diode for detecting laser beam pulse envelopes. These envelopes may be measured for such parameters as pulse width, and interval. A focal plane array camera is provided to measure boresight deviation from the unit undergoing test.

Additionally, traditional phased arrays utilize analog up converters followed by phase shifters and SSPA's and LNA's to drive each element in the phased array. Architecture is inherently band limited due to VSWR effects and group delay as percent bandwidth increases. Analog to digital converters and Digital to analog converters for mixed mode signal processing are limited to sample rates 2 GSPS forcing frequency conversion and band folding to implement bandwidths an octave. Few DSP FPGA's operate at these rates with manageable power dissipation.

An example of a light weight portable phased array antenna is for receiving communication signals from satellites having plurality of subplates, a plurality of antenna nodes supported on the top surface of each subplate, and an electronic control unit to which the subplates are fixed and aligned and a collapsible support stand fixed to the bottom of the electronic control unit opposite the subplates in which the subplates, electronic control unit and stand interconnect to form an easily assembled lightweight antenna assembly that may be disassembled into easily portable components.

Another example of a compact phased array antenna system includes circuitry and an antenna unit. The antenna unit includes a multilayer circuit board. The circuitry provides radio frequency signals, control signals and power to the circuit board. The circuit board has an array of antenna elements on one side thereof, and has a plurality of modules soldered to and projecting outwardly from the opposite side thereof. The modules each have electronic circuitry thereon, which is electrically coupled to the circuit board. Each module includes a thermal transfer element, the heat generated by the electronic components on that module being thermally transferred by the thermal transfer element to a cooling section.

Another example is directed to a method and structure for phased array antenna interconnect using an array of substrate slats. The phased array antenna is formed from an array of apertures having walls containing phase shifter devices for phase shifting and beam steering a radiated beam of the phased array antenna. The phase shifter devices are interconnected with an interconnect structure formed from substrate slats that form the walls of the apertures. The substrate slats may be thin film circuitized column slats having a metal substrate, dielectric layers, metal bias/control circuitry, a shielding layer, and circuit terminations to connect to a phase shifter device attached to the substrate slat.

SUMMARY OF THE INVENTION

In view of the foregoing background, it is an object of the present invention to provide RP signal receiver including optical processing and increased bandwidth.

This and other objects, features, and advantages in accordance with various embodiments of the present invention may be provided by a signal receiver, such as an RF-matched filter receiver, including an optical source (e.g. a mode-locked laser) providing an optical signal, and a first optical modulator to modulate the optical signal with a received RF signal and provide a modulated optical signal. A second optical modulator modulates the modulated optical signal with a reference signal and provides a twice modulated optical signal. The modulators may be Mach-Zehnder Modulators (MZM) and/or Indium Phosphide (InP) modulators. An optical detector receives the twice modulated optical signal and provides a detected signal, and a processing unit receives the detected signal and measures or extracts a cross-correlation between the received RF signal and the reference signal.

The second optical modulator may include at least one optical phase shifter. Also, the optical detector may be a low-bandwidth optical detector to detect the optical power of the twice modulated optical signal and provide the detected signal being proportional to an integrated optical power. The processing unit may control delay of the reference signal to the second optical modulator and extract or measure cross-correlation between the received RF signal and the reference signal based upon detected integrated optical power for different delay settings.

Another aspect is directed to an RE-optical matched filter receiver including an optical source, such as a mode-locked laser, providing an optical signal, and a first optical modulator to modulate the optical signal with a received RF signal and provide a modulated optical signal. An optical splitter splits the modulated optical signal into split optical signals on multiple signal paths, and a modulator array, including a second optical modulator in each signal path, modulates the respective split optical signals with a reference signal and provides a twice modulated optical signal. An optical detector in each signal path respectively receives the twice modulated optical signal and provides a detected signal, and a processing unit receives the detected signal.

The optical detector may be a low-bandwidth optical detector to detect the optical power of the twice modulated optical signal and provide the detected signal being proportional to an integrated optical power. The processing unit may control delay of the reference signal to the second optical modulator and extract or measure cross-correlation between the received RF signal and the reference signal based upon detected integrated optical power for different delay settings.

A method aspect is directed to processing an RF signal including providing an optical signal, modulating the optical signal with a received RE signal to provide a modulated optical signal, modulating the modulated optical signal with a reference signal to provide a twice modulated optical signal, detecting the optical power of the twice modulated optical signal to provide a detected signal, and processing the detected signal to extract or measure cross-correlation between the received RE signal and the reference signal. Modulating may include the use of at least one of a Mach-Zehnder Modulator (MZM) and an Indium Phosphide (InP) modulator.

Detecting the optical power of the twice modulated optical signal may provide a detected signal that is proportional to the integrated optical power. And, processing may include controlling delay of the reference signal, and extracting or measuring cross-correlation between the received RF signal and the reference signal based upon integrated optical power of the detected signal for different delay settings.

The method may include splitting the modulated optical signal into mutually coherent optical signals on multiple signal paths with an optical splitter before modulating with the reference signal to provide respective twice modulated optical signals on each signal path. Detecting may comprise detecting the optical power of the twice modulated optical signal in each signal path to provide respective detected signals.

Optical processing of the present approach avoids the need for high data rate digital processing and may reduce the sampling rate needed. The collection bandwidth in this approach is increased compared to the conventional DSP approach. For example, the approach is applicable to broadband phased array antennas, and supports both receive and transmit for communications and RADAR.

DESCRIPTION OF THE ILLUSTRATIVE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
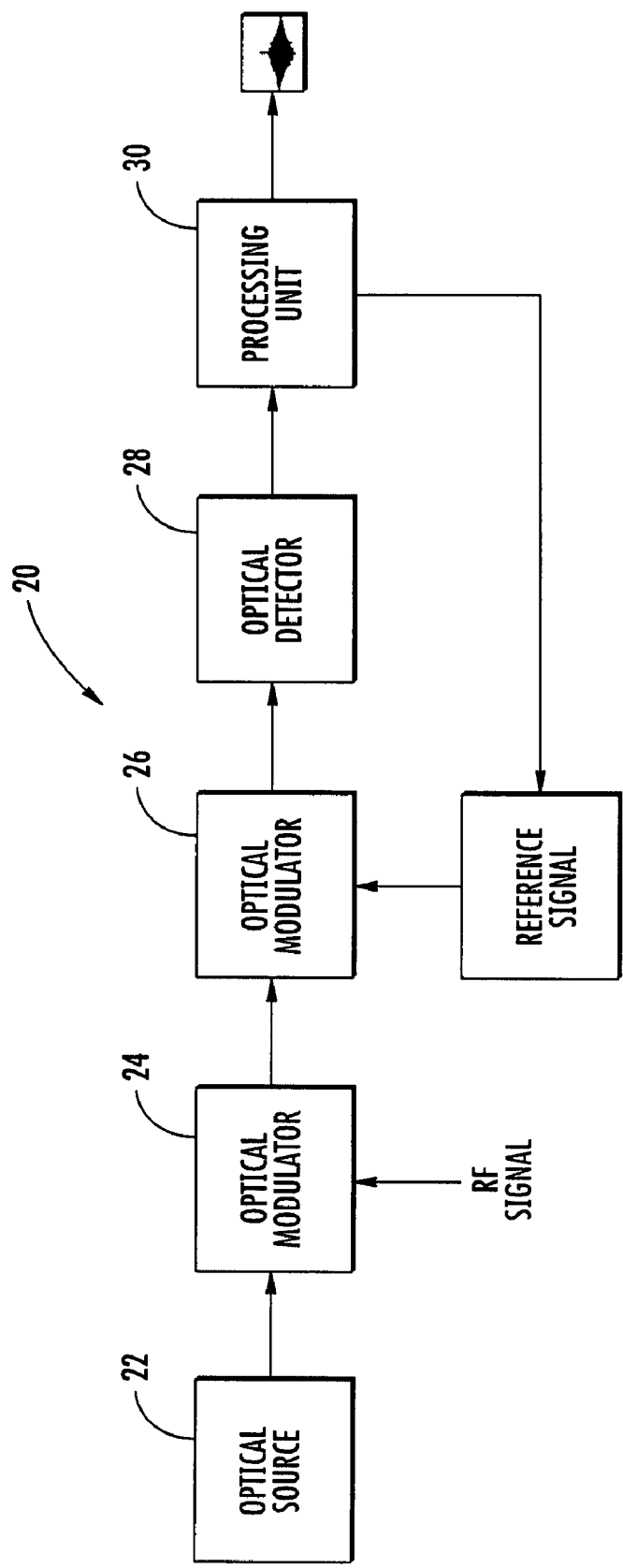
FIG. 1 is a block diagram of an optical matched filter according to an embodiment.

With reference to FIG. 1, a signal receiver 20, such as an RF matched filter receiver, using optical techniques will be described. The RF matched filter receiver 20 provides a cross-correlation between two signals such as an RF signal (e.g. a received RADAR signal) and a reference signal (e.g. a copy of the transmit RADAR signal). The receiver 20 includes an optical source 22 (typically a laser) that produces a continuous waveform or pulsed (e.g. from a mode-locked laser) optical signal. An electrical RF signal (e.g. coming from a receiving antenna) modulates the power of the optical signal via a first optical modulator 24.

An electrical reference signal (the signal the received RF signal will be compared with) modulates the already modulated signal once again in the second optical modulator 26. A low-bandwidth optical detector 28 is used to detect the power of the twice modulated signal. The bandwidth of this optical detector 28 may be smaller than the RF signal bandwidth, therefore an averaging/integration of the signal takes place.

A processing unit 30 receives the electrical signal that is proportional to the integrated optical power. The processing unit 30 has the ability to delay the reference signal in time. By measuring the integrated optical power for different delay settings, the cross-correlation between the RF signal and the reference signal can be measured.

Other embodiments may replace the second optical modulator 26 with a device as described in: United States Patent Application Publication No. 2005/0168364 to Chen et al. and entitled "Optical Digital-to-Analog Converter"; United States Patent Application Publication No. 2005/0068887 to Chen et al. and entitled "high speed modulation of optical subcarrier"; United States Patent Application Publication No. 2004/0208642 to Chen et al. and entitled "analog modulation of optical signals", all of which are herein incorporated by reference.

Figure 2:
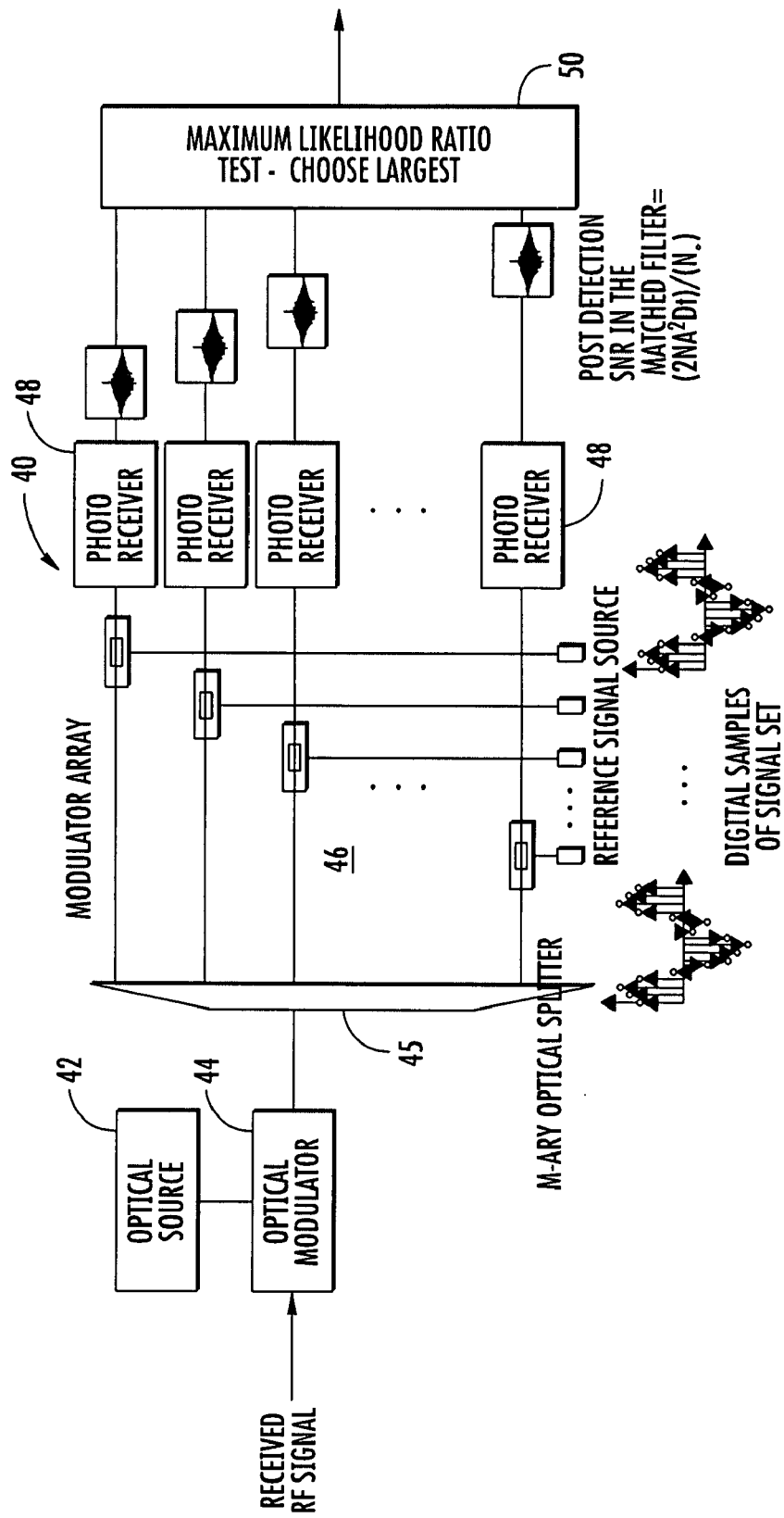
FIGS. 2 and 3 are schematic diagrams illustrating a multichannel optical matched filter according to another embodiment.
Figure 3:
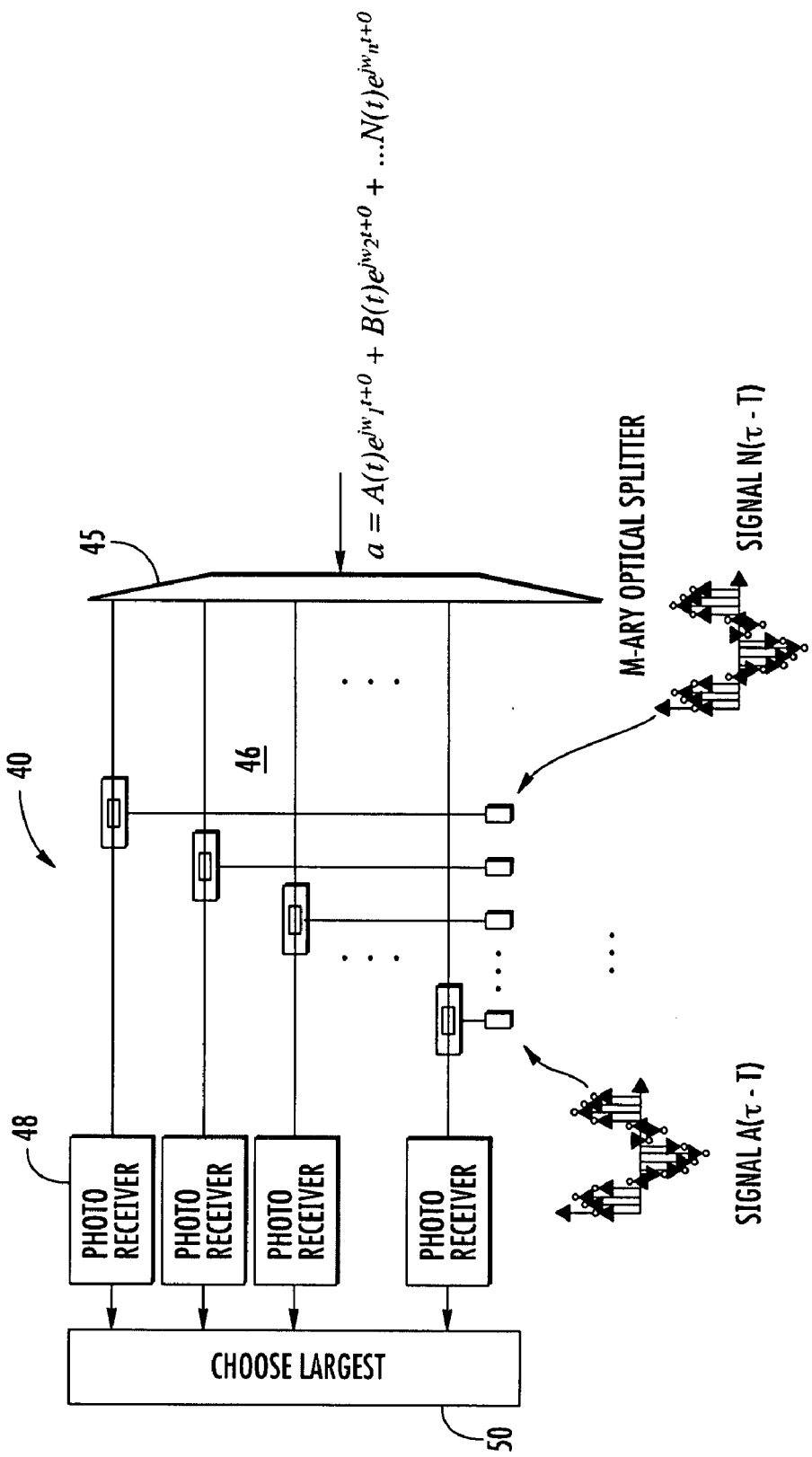

An M-ary optical matched filter receiver 40 or RF matched filter using optical techniques will be described with additional reference to FIG. 2 (illustrated with the optical signal source 42 and first modulator 44) and FIG. 3 (illustrated without the optical signal source and first modulator). An optical splitter 45 (e.g. a power or intensity splitter or WDM splitter) provides multiple parallel signal paths to a modulator array 46 (e.g. InP modulator array) defined by multiple matched filters as described above. Lowspeed photodetection at photoreceivers or detectors 48 forms the cross-correlation function between the received RP and reference signals (e.g. replica of each complex symbol and the received waveform at baseband). For example, post detection signal-to-noise ratio (SNR) in the matched filter receiver 40 may be $(2NA^2Dt)/(N_o)$. Fourier processing is done optically allowing baseband sampling and processing at processor 50 of the convolved result.

Traditional digital processing requires A/D sampling of the IF at 2× the desired collection bandwidth and FFT/DFT processing to synthesize the matched filter response. Optical processing of the present approach eliminates this high data rate digital processing and reduces the sampling rate to slightly more than the pulse repetition frequency of the radar. The collection bandwidth in this approach is increased compared to the conventional DSP approach.

The approach is applicable to broadband phased array antennas (UHF to 110 GHz and beyond), and supports both receive and transmit for communications and RADAR. The approach also supports receive only operation.

Figure 6:
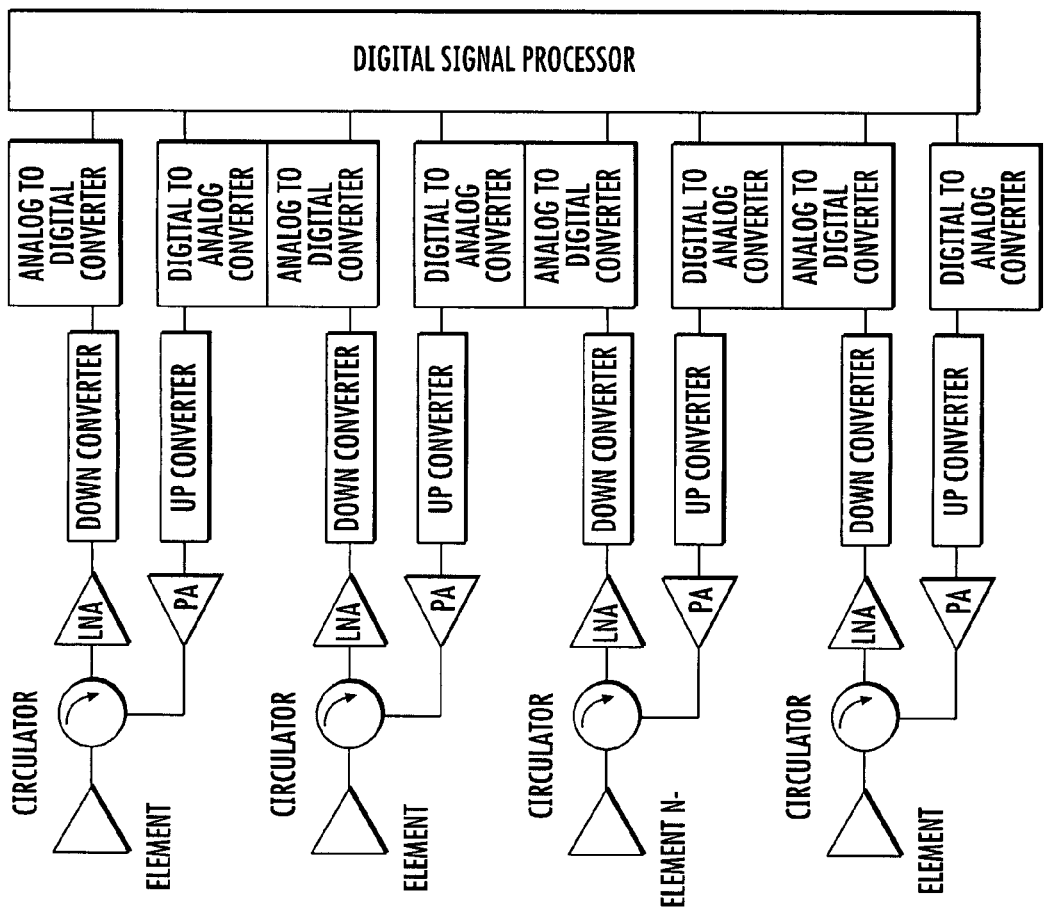
FIGS. 6 and 7 are schematic diagrams illustrating a conventional DSP approach to a phased array antenna system including a DSP.
Figure 7:
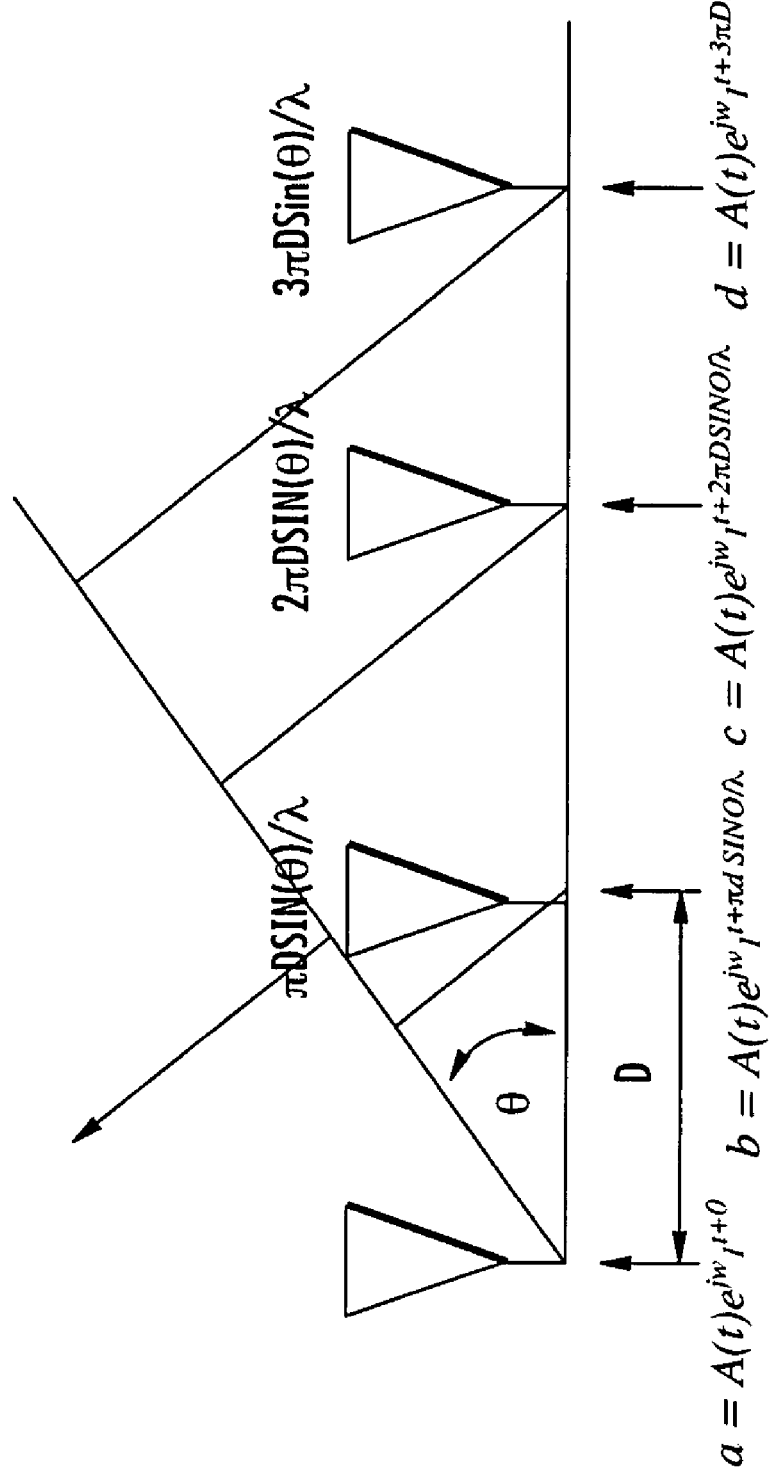

For example, a beamforming technique in a phased array antenna 60 will be described with reference to FIGS. 4-8. As discussed above, traditional phased arrays (as illustrated in FIGS. 6 and 7) utilize analog up converters followed by phase shifters and SSPA's and LNA's to drive each element in the phased array. Architecture is inherently band limited due to VSWR effects and group delay as percent bandwidth increases. Analog to digital converters and Digital to analog converters for mixed mode signal processing are limited to sample rates 2 GSPS forcing frequency conversion and band folding to implement bandwidths an octave. Few DSP FPGA's operate at these rates with manageable power dissipation.

Figure 4:
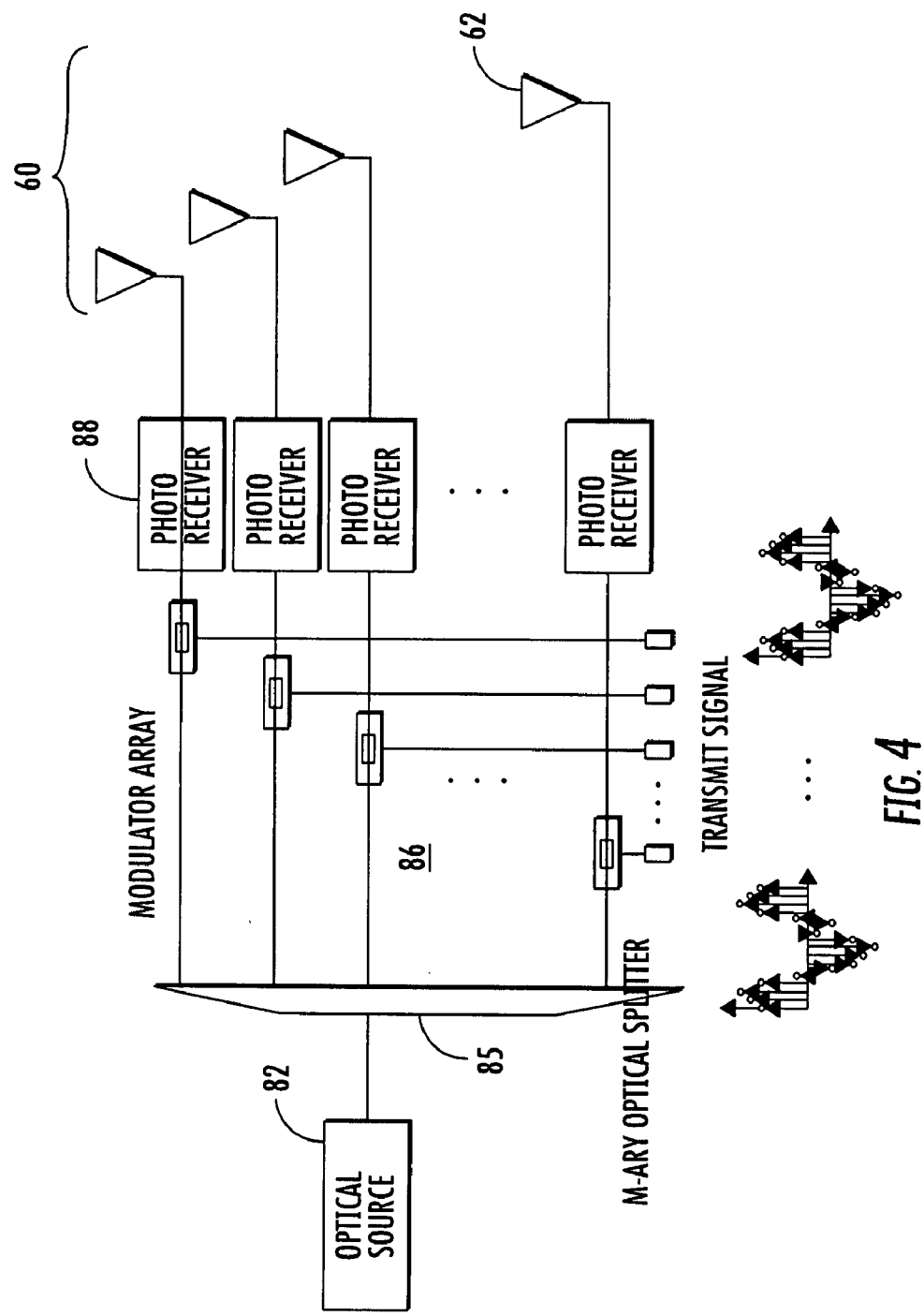
FIG. 4 is a schematic diagram illustrating the transmit portion of a broadband optical beamforming embodiment.
Figure 5:
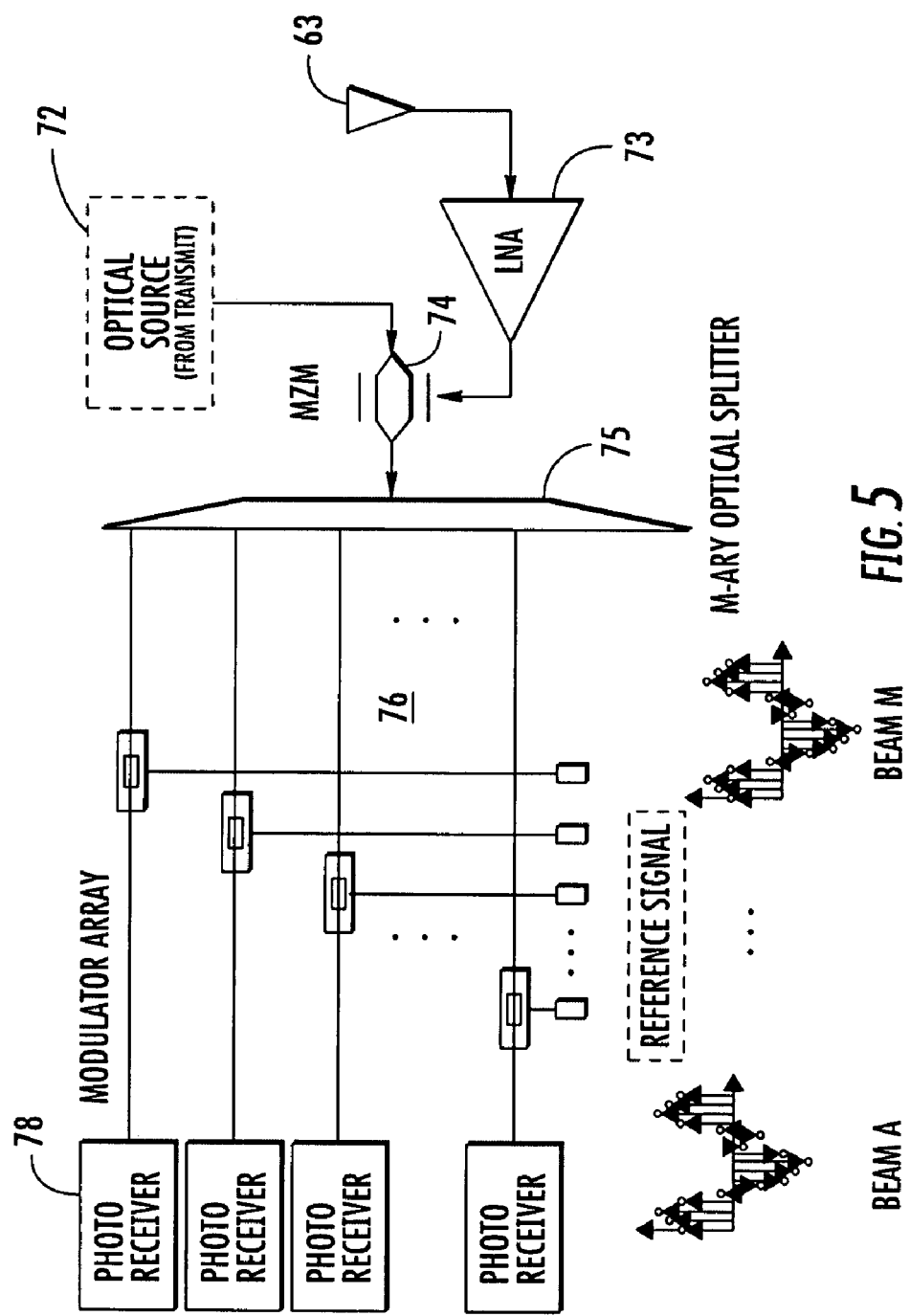
FIG. 5 is a schematic diagram illustrating the receive portion of a broadband optical beamforming embodiment.

FIG. 4 represents the transmit side of the optical beamforming, and FIG. 5 represents the receive side. In the present approach, the optical modulator array 86 may possess a bandwidth>10 Thz making percent bandwidth of RF signal<0.001%. Individual fibers run to each antenna element 62 and carry transmitted signals modulated on an optical carrier via optical source 82, splitter 85, modulator array 86 and photoreceivers or detectors 88. Optical photodetection forms the transmitted RF signal at each antenna element 62. The receive side (FIG. 5) uses an amplifier 73 (e.g. LNA) and an optical modulator 74 (e.g. an InP Mach Zehnder modulator) to convert low power RF signal to modulated light. The RF matched filter approach, described above, is then used to provide the beamforming.

Figure 8:
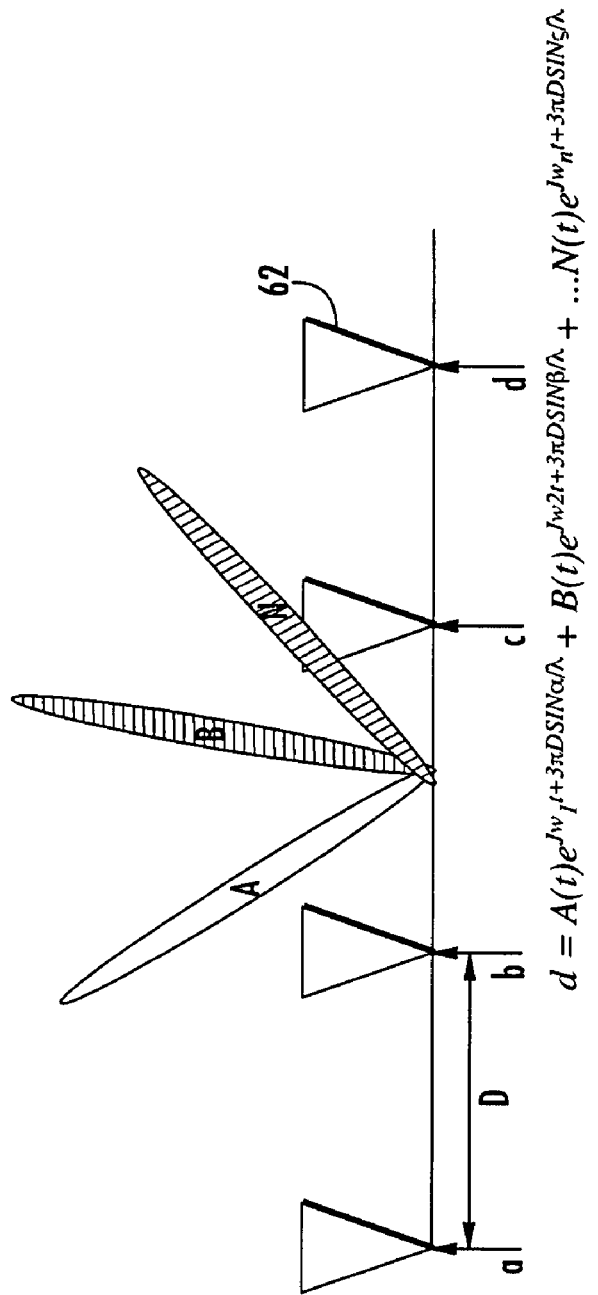
FIG. 8 is a schematic diagram illustrating a phased array antenna and a plurality of beams.
Figure 9A:
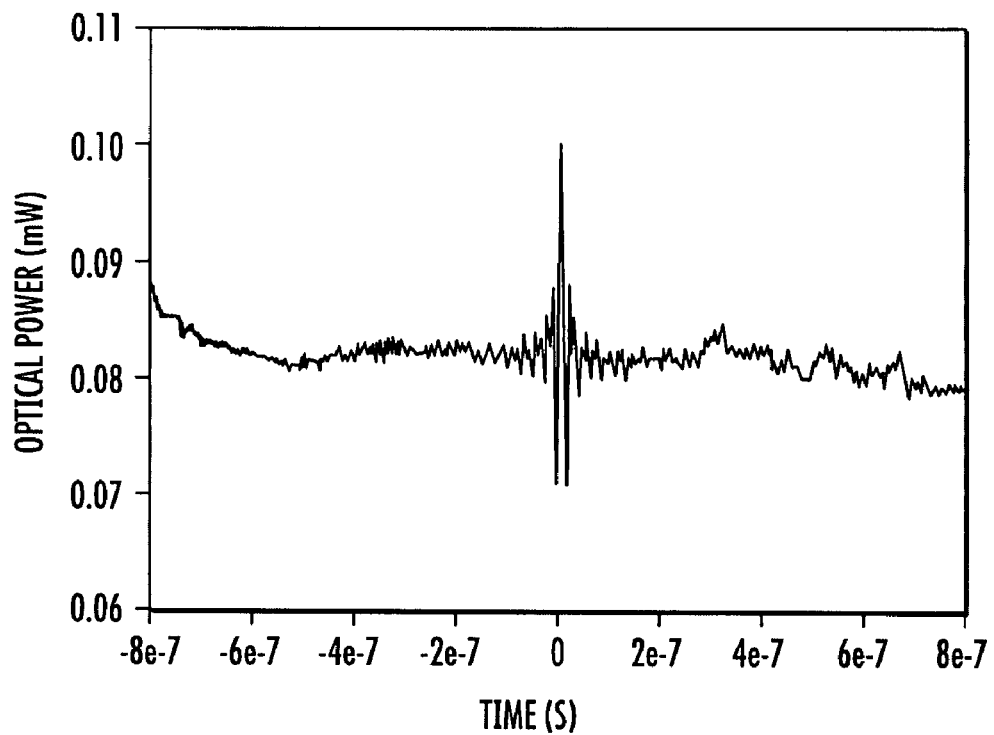
FIGS. 9A and 9B are timing diagrams illustrating example test results from the optical matched filter approach.
Figure 9B:
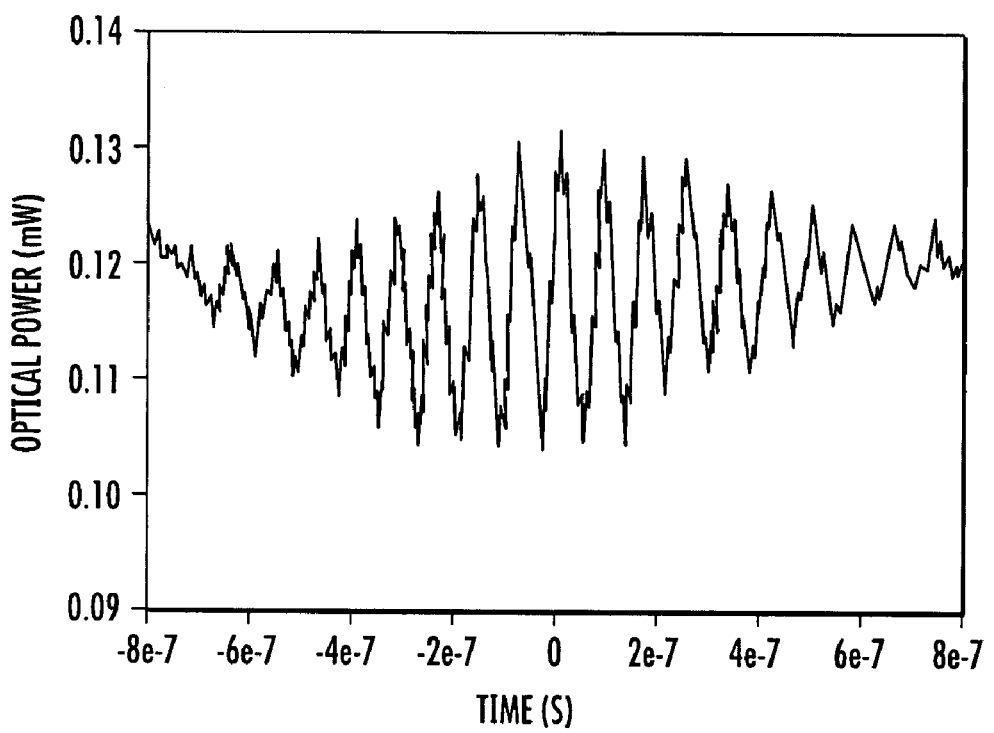

Referring to the phased array including antenna elements 62 as illustrated in FIG. 8, the optical modulator (e.g. Indium Phosphide) is a broadband linear reciprocal device, thus superposition applies allowing simultaneous formation of an almost unlimited number of beams (e.g. without electrical phase shifters, modulators and up-converters). An example of test results from the optical matched filter approach as described in the embodiments herein are shown in FIG. 9A for a pulsed sinusoidal waveform at 12.5 MHz, tp=0.8 µs (T*BW=10 dB), and in FIG. 9B for a pulsed linear-frequency modulation (LFM) waveform centered at 50 MHz, Span 25 MHz, tp=0.8 µs (T*BW=13 dB).

Modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A signal receiver comprising:
an optical source providing an optical signal;
a first optical modulator to modulate the optical signal with a received RF signal and provide a modulated optical signal;
a second optical modulator to modulate the modulated optical signal with a reference signal and provide a twice modulated optical signal;
a low-bandwidth optical detector to receive the twice modulated optical signal, detect the optical power thereof and provide a detected signal being proportional to an integrated optical power; and
a processing unit to receive the detected signal and extract a cross-correlation between the received RF signal and the reference signal, wherein the processing unit controls delay of the reference signal to the second optical modulator and measures the cross-correlation between the received RF signal and the reference signal based upon detected integrated optical power for different delay settings.

2. The signal receiver according to claim 1, wherein the optical source comprises a laser.

3. The signal receiver according to claim 1, wherein the optical modulators each comprise at least one of a Mach-Zehnder Modulator (MZM) and an Indium Phosphide (InP) modulator.

4. An RF-optical matched filter receiver comprising:
an optical source providing an optical signal;
a first optical modulator to modulate the optical signal with a received RF signal and provide a modulated optical signal;
an optical splitter to split the modulated optical signal into split optical signals on multiple signal paths;
a modulator array including a second optical modulator in each signal path to modulate the respective split optical signals with a reference signal and provide a twice modulated optical signal;
an optical detector in each signal path to respectively receive the twice modulated optical signal and provide a detected signal; and
a processing unit to receive the detected signals and choose a desired signal including controlling delay of the reference signal to the second optical modulator and measuring a cross-correlation between the received RF signal and the reference signal based upon detected integrated optical power for different delay settings.

5. The RF-optical matched filter receiver according to claim 4, wherein the optical detector comprises a low-bandwidth optical detector to detect the optical power of the twice modulated optical signal and provide the detected signal being proportional to an integrated optical power.

6. The RF-optical matched filter receiver according to claim 4, wherein the optical source comprises a laser.

7. The RF-optical matched filter receiver according to claim 4, wherein the optical modulators each comprise at least one of a Mach-Zehnder Modulator (MZM) and an Indium Phosphide (InP) modulator.

8. A method of processing a received RF signal comprising:
generating an optical signal;
modulating the optical signal with the received RF signal to provide a modulated optical signal;
modulating the modulated optical signal with a reference signal to provide a twice modulated optical signal;
detecting the optical power of the twice modulated optical signal to provide a detected signal that is proportional to the integrated optical power; and
processing the detected signal to extract a cross-correlation between the received RF signal and the reference signal including controlling delay of the reference signal, and measuring the cross-correlation between the received RF signal and the reference signal based upon integrated optical power of the detected signal for different delay settings.

9. The method according to claim 8, wherein generating the optical signal comprises generating the optical signal with a laser.

10. The method according to claim 8, further comprising splitting the modulated optical signal into mutually coherent optical signals on multiple signal paths with an optical splitter before modulating with the reference signal to provide respective twice modulated optical signals on each signal path.

11. The method according to claim 10, wherein detecting comprises detecting the optical power of the twice modulated optical signal in each signal path to provide respective detected signals.

12. The method according to claim 8, wherein modulating comprises the use of at least one of a Mach-Zehnder Modulator (Mad) and an Indium Phosphide (DIP) modulator.

* * * * *